(12) United States Patent
Dluhy

(10) Patent No.: US 11,782,593 B1
(45) Date of Patent: Oct. 10, 2023

(54) WIRELESS PERSONAL PROTECTION DEVICE AND METHODS OF USE

(71) Applicant: ADVANCED ELECTRONIC DESIGN, INC., North Attleboro, MA (US)

(72) Inventor: James Dluhy, North Attleboro, MA (US)

(73) Assignee: ADVANCED ELECTRONIC DESIGN, INC., North Attleboro, MA (US)

( * ) Notice: Subject to any disclaimer, the term of this patent is extended or adjusted under 35 U.S.C. 154(b) by 0 days.

(21) Appl. No.: 16/896,286

(22) Filed: Jun. 9, 2020

Related U.S. Application Data

(60) Provisional application No. 62/859,187, filed on Jun. 9, 2019.

(51) Int. Cl.
| | |
|---|---|
| *G06F 3/04883* | (2022.01) |
| *H04L 9/32* | (2006.01) |
| *G06F 21/32* | (2013.01) |
| *G06F 1/16* | (2006.01) |
| *G06V 40/13* | (2022.01) |

(52) U.S. Cl.
CPC ........ *G06F 3/04883* (2013.01); *G06F 1/1626* (2013.01); *G06F 21/32* (2013.01); *G06V 40/13* (2022.01); *H04L 9/3247* (2013.01)

(58) Field of Classification Search
CPC .... G06F 3/04883; G06F 1/1626; G06F 21/32; G06K 9/00013; H04L 9/3247
See application file for complete search history.

(56) References Cited

U.S. PATENT DOCUMENTS

| | | | |
|---|---|---|---|
| 5,983,073 | A | 11/1999 | Ditzik |
| 6,101,562 | A | 8/2000 | Chang et al. |
| 6,133,847 | A | 10/2000 | Yang |
| 6,985,755 | B2 | 1/2006 | Cadieux et al. |

(Continued)

FOREIGN PATENT DOCUMENTS

| | | |
|---|---|---|
| EP | 1688831 B1 | 1/2009 |
| JP | 6378487 B2 | 8/2018 |

*Primary Examiner* — Yaron Cohen
(74) *Attorney, Agent, or Firm* — John Brooks Law LLC; John J. Brooks, III

(57) ABSTRACT

A wireless interface device for communicating an input signal to a processor-based host is provided. The wireless interface device includes a processor, a display and a wireless communication component. The display comprises a touchscreen, a touchscreen controller and a memory liquid crystal display. The display is configured to receive and translate an input to an input signal and communicate the input signal to the microprocessor. The wireless communication component is configured to receive the input signal from the processor and communicate the input signal over a communications channel to the processor-based host. In some embodiments, the wireless interface device comprises a hand-held device casing, a user interface, a wireless communication component configured to communicate with a vehicle-based host, a signature capture component configured to capture a digital signature from the user interface, and an application program module configured to receive and communicate the digital signature to the vehicle-based host.

16 Claims, 8 Drawing Sheets

(56) References Cited

U.S. PATENT DOCUMENTS

| | | |
|---|---|---|
| 7,006,881 B1 | 2/2006 | Hoffberg et al. |
| 7,266,777 B2 | 9/2007 | Scott et al. |
| 7,461,343 B2 | 12/2008 | Kates |
| 7,610,555 B2 | 10/2009 | Klein et al. |
| 7,626,576 B2 | 12/2009 | Anandakumar et al. |
| 7,650,445 B2 | 1/2010 | Ma et al. |
| 7,831,930 B2 | 11/2010 | Dresti et al. |
| 8,558,790 B2 | 10/2013 | Kim |
| 8,743,082 B2 | 6/2014 | Ganapathi et al. |
| 2002/0023215 A1* | 2/2002 | Wang .................. H04L 63/0853 713/184 |
| 2007/0080845 A1 | 4/2007 | Amand |
| 2007/0093926 A1 | 4/2007 | Braun |
| 2007/0146329 A1 | 6/2007 | Huang et al. |
| 2007/0229465 A1 | 10/2007 | Sakai et al. |
| 2008/0120448 A1 | 5/2008 | Shi et al. |
| 2010/0037180 A1 | 2/2010 | Elias et al. |
| 2010/0138764 A1 | 6/2010 | Hatambeiki et al. |
| 2010/0141596 A1 | 6/2010 | Junk |
| 2010/0218214 A1 | 8/2010 | Fan et al. |
| 2010/0238119 A1* | 9/2010 | Dubrovsky ........... G06F 1/1626 345/169 |
| 2011/0032214 A1 | 2/2011 | Gruhlke et al. |
| 2012/0140124 A1 | 6/2012 | Moroney et al. |
| 2013/0002576 A1 | 1/2013 | Kim et al. |
| 2014/0253298 A1 | 9/2014 | Srivastava |
| 2016/0192011 A1 | 6/2016 | Toh et al. |
| 2016/0299496 A1 | 10/2016 | Reichard et al. |
| 2017/0126420 A1 | 5/2017 | Zhang et al. |
| 2017/0180361 A1* | 6/2017 | Sampas ................ H04L 63/0861 |
| 2017/0347053 A1 | 11/2017 | Rylskyi et al. |
| 2018/0098109 A1 | 4/2018 | Seo et al. |
| 2018/0309329 A1* | 10/2018 | Zeine ..................... H02J 50/40 |
| 2019/0065822 A1* | 2/2019 | Hong ................... G06K 9/4642 |
| 2019/0098725 A1* | 3/2019 | Sadwick .................... F21S 2/00 |
| 2020/0142395 A1* | 5/2020 | Delbari ................. B60K 35/00 |

* cited by examiner

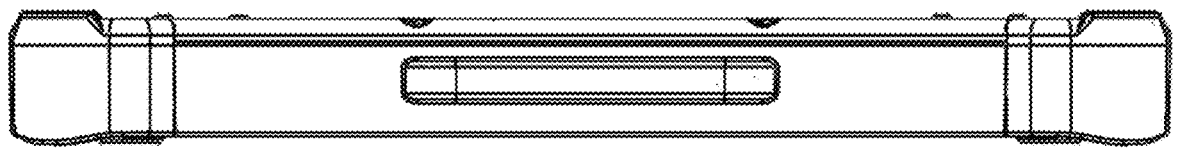
FIG. 6D
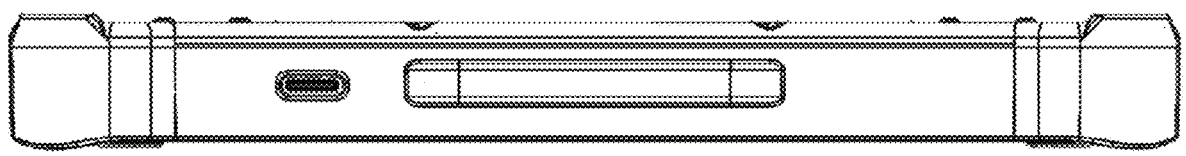
FIG. 6E
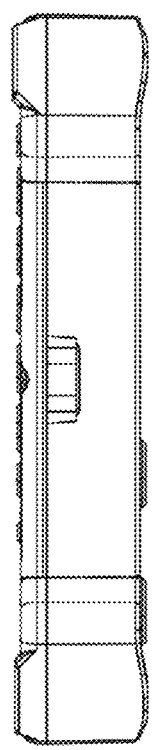 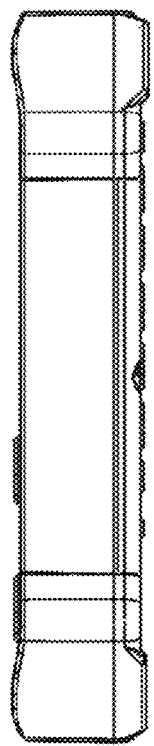
FIG. 6F    FIG. 6G

WIRELESS PERSONAL PROTECTION DEVICE AND METHODS OF USE

CROSS-REFERENCE TO RELATED APPLICATIONS

This application claims the benefit of U.S. App. No. 62/859,187, filed on Jun. 9, 2019, entitled "WIRELESS INTERFACE SYSTEM AND METHODS OF USE," the entire contents of which are incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

This invention relates to computer input devices, in particular to wireless interface devices. In one example embodiment, the wireless interface device is a low-power processor-based device configured to provide the functionality of providing control functions to another processor-based host. In one example embodiment, the wireless interface device is a processor-based personal protection device configured to provide personal protection functions to users such as first responders.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In some embodiments of the wireless interface system, a wireless interface device for communicating an input signal to a processor-based host is provided. In an example embodiment, a wireless interface device for communicating an input signal to a processor-based host is provided, the wireless interface device comprising a processor in communication with a display and a wireless communication component. The display comprises a touchscreen, a touchscreen processor and a memory liquid crystal display. The display is configured to receive an input, translate the input to an input signal and communicate the input signal to the processor. The wireless communication component is configured to receive the input signal from the processor and communicating the input signal over at least one communications channel to the processor-based host. In some embodiments, the wireless interface device further comprises a strobe light controlled by a button positioned on the wireless interface device.

In some embodiments, the wireless interface system comprises a configurable portable personal protection device for use by a first responder. In an example embodiment, the configurable portable personal protection device for use by a first responder comprises a device casing having a front side and a back side, a power source, a processor in communication with a light source, a button switch, a display and a device application module, the button switch positioned on the front side of the device casing, the light source positioned on the back side of the device casing, the light source activated by the button switch, the device application module configured to configure one of a plurality of lighting effects for the light source when activated by the button switch, and the light source comprises a high power Light-Emitting Diode (LED). In some embodiments, the configurable portable personal protection device further comprises a display in communication with the processor, a wireless communication component in communication with the processor, the display configured to receive an input, translate the input to an input signal and communicate the input signal to the processor, and the wireless communication component configured to receive the input signal from the processor and communicate the input signal over at least one communications channel to a processor-based host. In some embodiments, the LED comprises a multi-color LED and the plurality of lighting effects comprise at least one selected from the group consisting of: a flashlight, a strobe light, and an alert light.

In some embodiments, the wireless interface device comprises a portable personal protection device for use by a user having a vehicle-based host, the device comprising a device casing conforming to a hand-held form factor, a user interface comprising a touchscreen configured receive input from the user, a wireless communication component configured to communicate with the vehicle-based host, a signature capture component configured to capture a digital signature from the user interface, a processor in communication with the wireless communication component, the user interface and a device application module and the device application module configured to receive the representation of the signature and communicate the representation of the signature to the vehicle-based host.

In some embodiments, the wireless interface device comprises a processor in communication with a display and a wireless communication component; the display comprising: a touchscreen, a memory liquid crystal display, and a touchscreen controller; the display configured to receive an input, translate the input to an input signal and communicate the input signal to the processor; and the wireless communication component configured to receive the input signal from the processor and communicate the input signal over at least one communications channel to the processor-based host.

In some embodiments, the wireless interface device further comprises a battery power source requiring a charge to provide power for the wireless interface device to operate and the wireless interface device configured to operate in a continual use mode for a period of 150 hours without requiring an additional charge to be provided to the battery power source.

In some embodiments, the wireless interface device further comprises a front lighting film in communication with the processor, a battery power source having a charge level for the wireless interface device to operate and the wireless interface device configured to operate in a continual use mode for a period of 150 hours without requiring an increase to the charge level of the battery power source.

In some embodiments, the display is configured to receive an input and translate the input to the input signal, the wireless communication component configured to receive the input signal and communicate the input signal according to a predefined application programming interface standard and the application programming interface standard defining a conversion of the input signal to one or more remote host client drivers selected from the group of client drivers comprising: a keyboard driver; and a mouse driver.

In some embodiments, the application programming interface standard comprises the Human Interface Device (HID) standard.

Other objects, features, and advantages of the techniques disclosed in this specification will become more apparent from the following detailed description of embodiments in conjunction with the accompanying drawings.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 6D-6G show top, bottom, right side and left side views respectively of an ornamental design of one example embodiment of a wireless interface device;

DETAILED DESCRIPTION OF THE INVENTION

Figure 1:
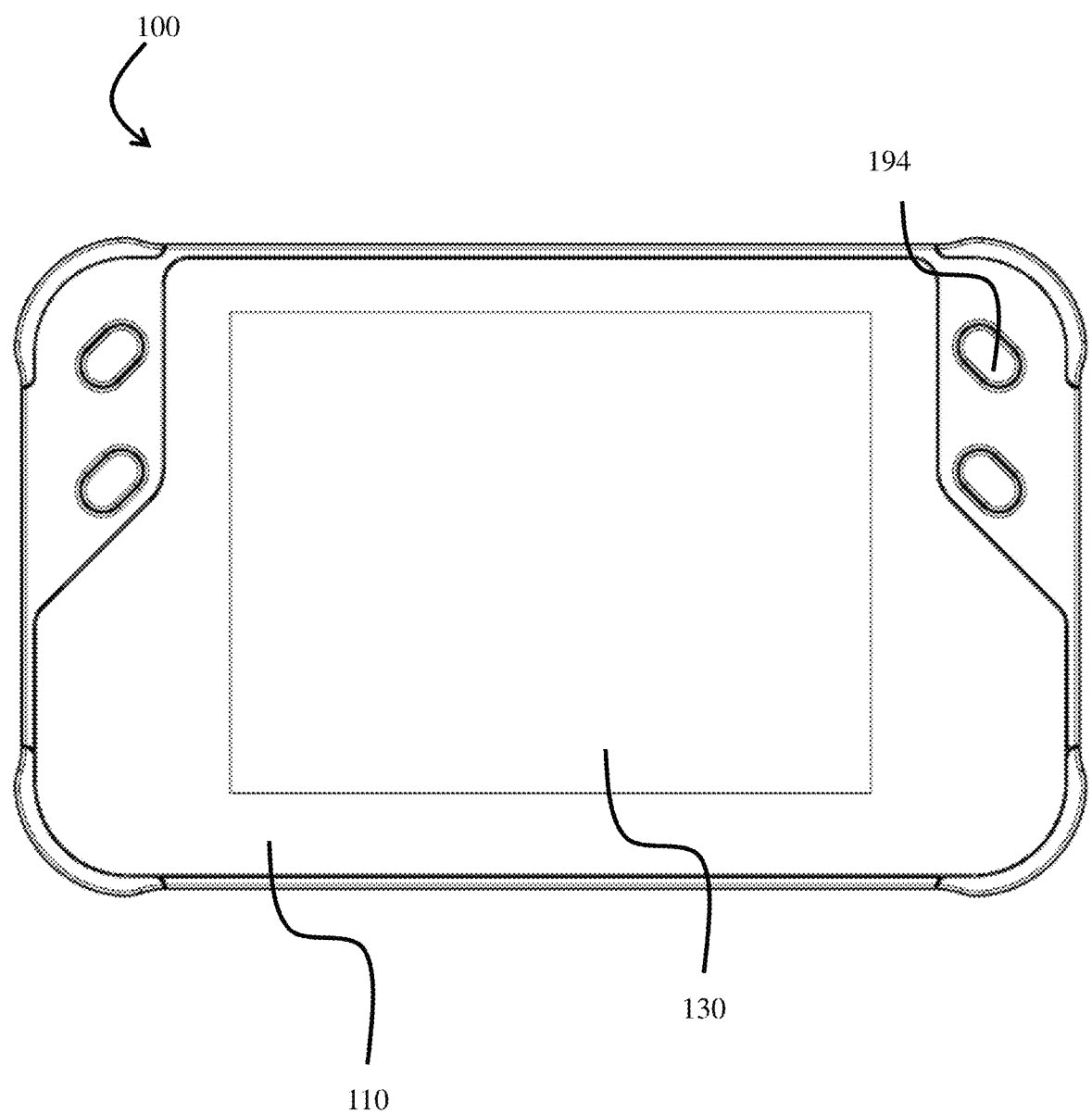
FIG. 1 shows a front view of an example embodiment of a wireless interface device.

COPYRIGHT NOTICE: A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright © Advanced Electronic Design, Inc., 2019-2020, All Rights Reserved.

Wireless interface systems and methods of use will now be described in detail with reference to the accompanying drawings. It will be appreciated that, while the following description focuses on a system that provides ultra-low power wireless interface devices, the systems and methods disclosed herein have wide applicability. For example, the wireless interface system described herein may be readily employed as a wireless interface system or a portable personal protection device for first responders such as law enforcement professionals, emergency medical service personnel, military personnel or civilian consumers. Notwithstanding the specific example embodiments set forth below, all such variations and modifications that would be envisioned by one of ordinary skill in the art are intended to fall within the scope of this disclosure.

As used herein, the term "module" refers to hardware and/or software implementing entities and does not include a human being. The operations performed by the "module" are operations performed by the respective hardware and/or software implementations, e.g. operations that transform data representative of real things from one state to another state, and these operations do not include mental operations performed by a human being. For example, a module may be an application implement in software.

The term "sensor", as used herein is a broad term and is to be given its ordinary and customary meaning to a person of ordinary skill in the art (and are not to be limited to a special or customized meaning), and furthermore refers without limitation to any sensor, such as a fingerprint reader, a barcode scanner, an accelerometer, an ambient light sensor, a camera a thermal camera or a signature recorder.

The Technical Problem

Computer technology has advanced to the point that computers are a critical tool commonly used in many professions. In parallel with the advancement of computers, wireless communication technology has advanced where wireless input/output devices can be used to interface with those computers. Wireless input devices provide benefits to users in that they require no wired connections with their host computers. However, the lack of a wired connection also requires that the wireless input devices contain their own power source which is typically a battery. In order to extend the life of their batteries, the wireless input devices must be properly designed and configured to minimize power consumption.

If the field of first responders and law enforcement, the increased reliance on processor-based systems to perform work had increase the number of devices that workers have to use to do their job. Many of these devices are repurposed commercial items without specific designs for specific environments such as those encountered by first responders. As a result, the use of these devices are not optimized for the safety and other specific needs of the first responders. In particular, sizes of devices can interfere with the first responder's need for mobility or to have their hands free for safety and other reasons. Also, the processes to safety operate in situations, such as a law enforcement stop, require frequent exchange of information from the vehicle which can expose the law enforcement officer to unsafe situations as may result from multiple trips to the vehicle.

Additionally, as technology develops in other areas such as lighting, sensors and alarms and weapons, the number of tools used in different professions grows while the space within which to use and store these technologies fails to grow or shrinks. In one profession such as law enforcement, the technical tools they use continues to grow but since the technology should be on the person's body or in their vehicle, consolidation of devices and functions becomes very important.

Unfortunately, solutions have not been found that meet many of these various needs. For example, some embodiments of using handheld computing devices, such as a smartphone or Pocket PC, are disclosed in U.S. Pat. Pub. No. 2008/0120448 for U.S. patent application Ser. No. 11/562, 398 to Yan Shi et al., filed on Nov. 21, 2006, the entire contents of which are herein incorporated by reference. However, in these embodiments, the power consumption of the device is increased by the fact that the handheld computing device performs many other functions. As another example, some embodiments of using power savings modes to minimize power demands are disclosed in U.S. Pat. No. 6,985,755 to Kevin Cadieux et al., issued Jan. 10, 2006, the entire contents of which are herein incorporated by reference. However, this solution fails to consider other components that may be able to contribute to lower power demands. And neither of these solutions consider the unique functions that may be required in specific uses such as in a use by law enforcement professionals.

Thus, there is a need in the art for a low power interface system designed to operate with an ultra-low power demand and provide specific functions for professions such as first responders and law enforcement professionals.

Thus, there is also a need in the art for a hand-held wireless interface system having a form factor and features specifically configured to operate with processor-based systems in locations such as the first responder's vehicle.

The Technical Solution

The wireless interface system provides the technical solution of providing an ultra-low power wireless interface device to a host computer while also providing specific functions for professions such as law enforcement professionals. This technical solution is provided by incorporating specific ultra-low power components and minimizing the functions of the device to only necessary functions. In particular, the components selected comprise a unique combination of: a multi-power mode capacitive touchscreen with a reflective memory Liquid Crystal Display (LCD); an ultra-low power microprocessor and flash memory; a Bluetooth 5 module; and a single lithium ion cell battery. In some embodiments, a custom front lighting film may also be used with the display.

The wireless interface system may also incorporate important safety features and applications for first responders within a wireless interface device having a small form factor. These features may be specifically configured to be simple to use when the user is wearing equipment and is within the constrained working environment of first responders. Components such as light sources and sound sources may be incorporated into the device to provide alarm, deterrence or visibility features. Functional components such as barcode sensors, infrared sensors, ETicket applications, fingerprint sensors and digital signature sensors may also be provided.

In combination, these components are able to provide an ultra-low power wireless interface device that is capable of operating powered for a much longer period of time that a traditional cell phone or tv remote. Combinations of components in an integrated wireless interface device may also increase the efficiency and safety for the user.

ONE EXAMPLE EMBODIMENT OF THE WIRELESS INTERFACE SYSTEM

The wireless interface system generally comprises a processor-based wireless interface device configured to communicate with and provide input to another processor-based host. The wireless interface device may comprise a casing, a display, a communications component, a power source and internal circuitry such as a processor and a memory. In some embodiments, the wireless interface device also comprises components such as, but not limited to, a USB port, lights, alarms and feedback components. In some embodiments, the wireless interface device is ruggedized. In some embodiments, the wireless interface device includes computer program code to provide instructions to the processor to execute a device application module. In some embodiments, the wireless interface device may also comprise functional and safety components such as but not limited to barcode scanners, infrared sensors, ETicket applications, fingerprint sensors and digital signature sensors.

The wireless interface device is generally configured to provide the functionality of providing control functions to another processor-based host. Generally, this functionality comprises functionality such as, communicating signals to and from a host, providing a customizable graphic interface to a user, providing customizable physical actuators such as buttons to a user and providing user access to processor-based application modules. The graphic interface may provide functionality such as keyboards, trackpads, sliders, and buttons. The communication of signals may comprise communication control signals to a host computer through standard HID Bluetooth protocols. Access to the application module may comprise access to actions such as launching the application module, running scripts, adjusting volume, or adjusting device parameters such as screen brightness.

Figure 8:
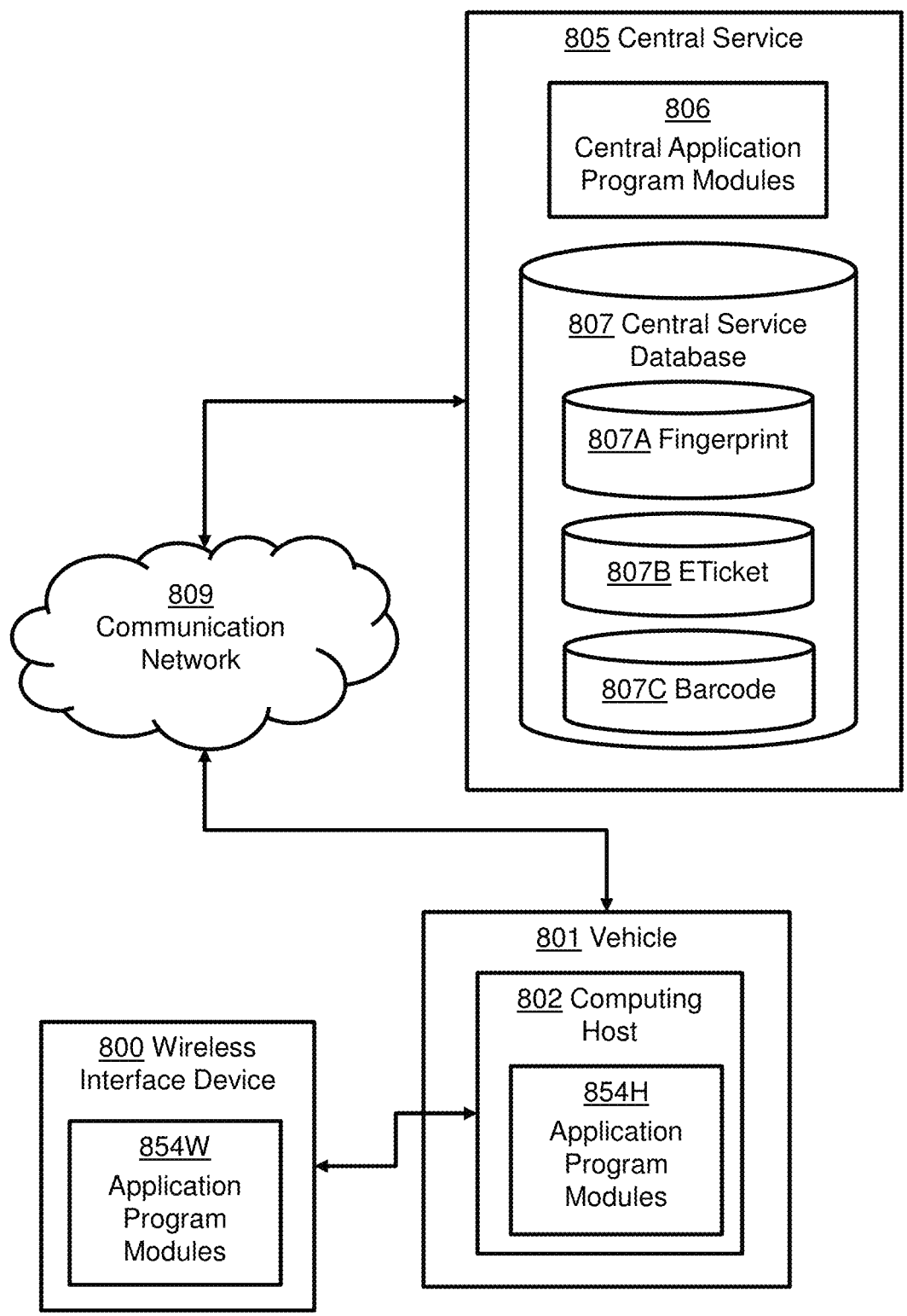
FIG. 8 shows a functional diagram of an example embodiment of a wireless interface device as part of an example information network.

A general overview of an example wireless interface system within an example information network for a first responder is shown in FIG. 8. A wireless interface device 800 is provided and is typically on the person or in close proximity to the first responder. The wireless interface device 800 may be in communication with a computing host 802 typically in the vehicle 801 of the user. The computing host 802 is in communication with a central service 805 through a communication network 809 such as a wireless data network. The central service 805 may provide central application program modules 806 and access to a central service database 807. The central application program modules 806 may be a web-based version of the application program modules described for the wireless interface devices or the computing host of they may include additional functionality. The central service database 807 may include information that is used with application program modules in the information network. For example, the central service 805 may have data such as fingerprint data 807A, ETicket data 807B or barcode data 807C that may operate with the application program modules as part of the central application program modules 806 or with the application program modules on the computing host 802 or on the wireless interface device 800. Also shown in FIG. 8 are application program modules 854W which may reside and be executed on the wireless interface device 800 and application program modules 854H which may reside and be executed on the computing host 802.

Referring to the example embodiment in FIG. 1, the wireless interface device 100 may comprise a casing 110, a display 130 and internal components (not shown) such as a power source, a communications component and other circuitry. In some embodiments, the wireless interface device further comprises interfaces such as buttons 194 and other components (not shown) such as one or more feedback components, one or more sensors and one or more safety components.

Figure 2A:
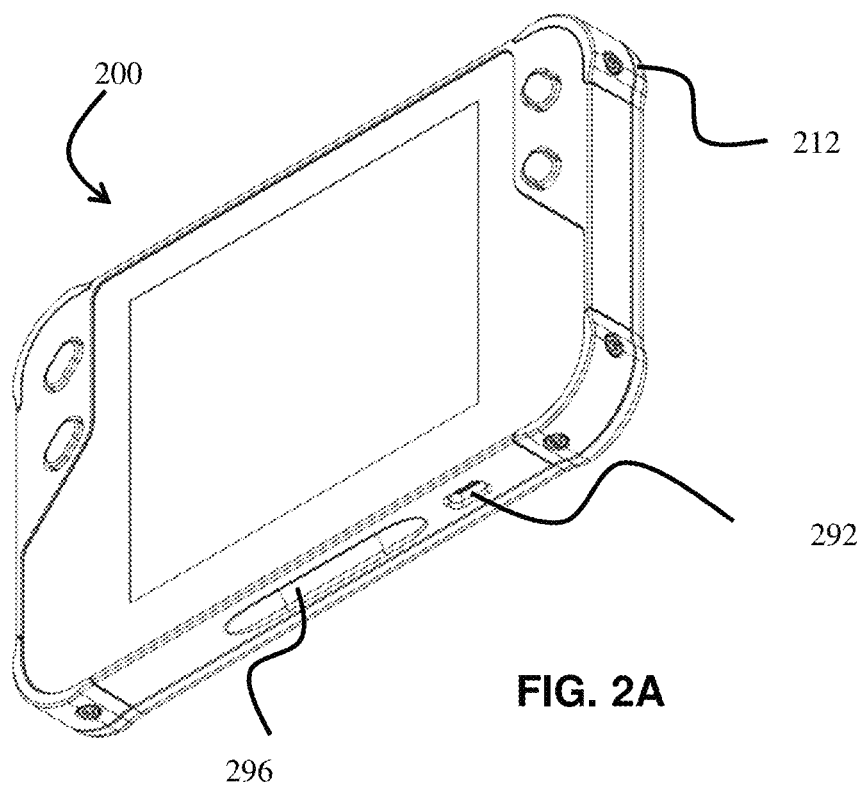
FIGS. 2A and 2B show a top perspective view of an example embodiment of a wireless interface device.

Referring to the example embodiment of FIG. 2A, the wireless interface device 200 may further comprise interfaces such as a USB interface 292, corner protectors 212 to provide hardening features for the device and mounting elements 296 such as the notch shown to mate with another mounting element to help secure the wireless interface device to another surface or element.

Figures 3, 4:
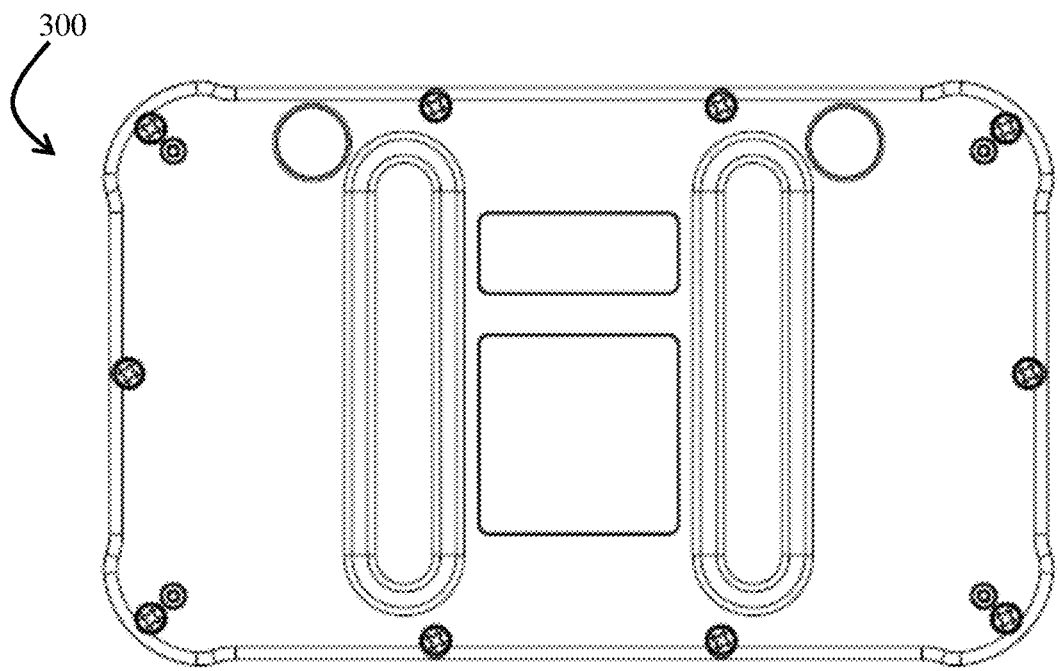
FIG. 3 shows a rear view of an example embodiment of a wireless interface device.
FIG. 4 shows a top view of an example embodiment of a wireless interface device.

FIG. 3 shows a rear view of an example embodiment of a wireless interface device 300 and FIG. 4 shows a top view of an example embodiment of a wireless interface device 400.

Casing

Referring to the example embodiment of FIG. 1, the casing 110 generally provides the housing to contain and couple the device components. The size of the casing may be any size suitable for its intended purpose. In some embodiments, the size of the wireless interface device is designed with dimensions in the range of about 4-8 inches long, about 2-5 inches wide and about 0.30-1 inches thick. In a preferred embodiment, the size of the wireless interface device is designed to be held by a single hand with dimensions in a range of about 6-7 inches long, about 3-4 inches wide and about 0.40-0.75 inches thick.

The size and form factor of the casing 110 may be configured to minimize the space requirements for first responders in their operational environment. The form factor may be minimized and may be used to replace other equipment. For example, the wireless interface device 100 and the casing 110 may be configured to replace the functionality of larger tablet computers currently used. The reduction in size from a tablet is particularly helpful since first responders typically carry a tablet device on a chest portion of their gear and reducing this form factor allows for more freedom of movement by the user. The wireless interface device 100 may also be configured to eliminate the need for stylus input since the stylus may be used as a weapon against the user. The device may also be configured to have input provided by fingers or thumbs like a cell phone because it is a common input method of users. Being able to use the wireless interface device 100 with a single hand frees the other hand of the user for safety purposes. Having a small form factor will also help reduce the "horizonal real estate" within the first responder's vehicle that is currently full of other equipment. The small form factor and features may replace larger equipment. In addition, some first responders with small waste's currently have problems putting all their equipment on their belt. Smaller equipment frees up real estate on the first responder's uniform and equipment. Having a small form factor also allows the device, and its features, to be portable and taken out of the vehicle if needed. Having a small form factor also provides safer ingress and egress for the first responder from the vehicle with less risk of larger equipment getting caught on other equipment in the vehicle.

In particular situations, such as in armored vehicles such as a "BEARCAT" armored vehicle, space within the vehicle is very limited. Having a handheld wireless interface device may allow the device to communicate with a centralized host and monitor to allow all vehicle riders to view the monitor. Current solutions do not provide these features without taking up more room in the vehicle.

In some embodiments the casing 110 is manufactured to be ruggedized to comply with Ingress Protection Code IP67 particulate and water resistance standards.

Display

Referring to the example embodiment of FIG. 1, the display 130 generally functions as a graphical user interface for the wireless interface device. In one example embodiment, the display 130 is selected and configured to be an ultra-low power consumption display.

Figure 5:
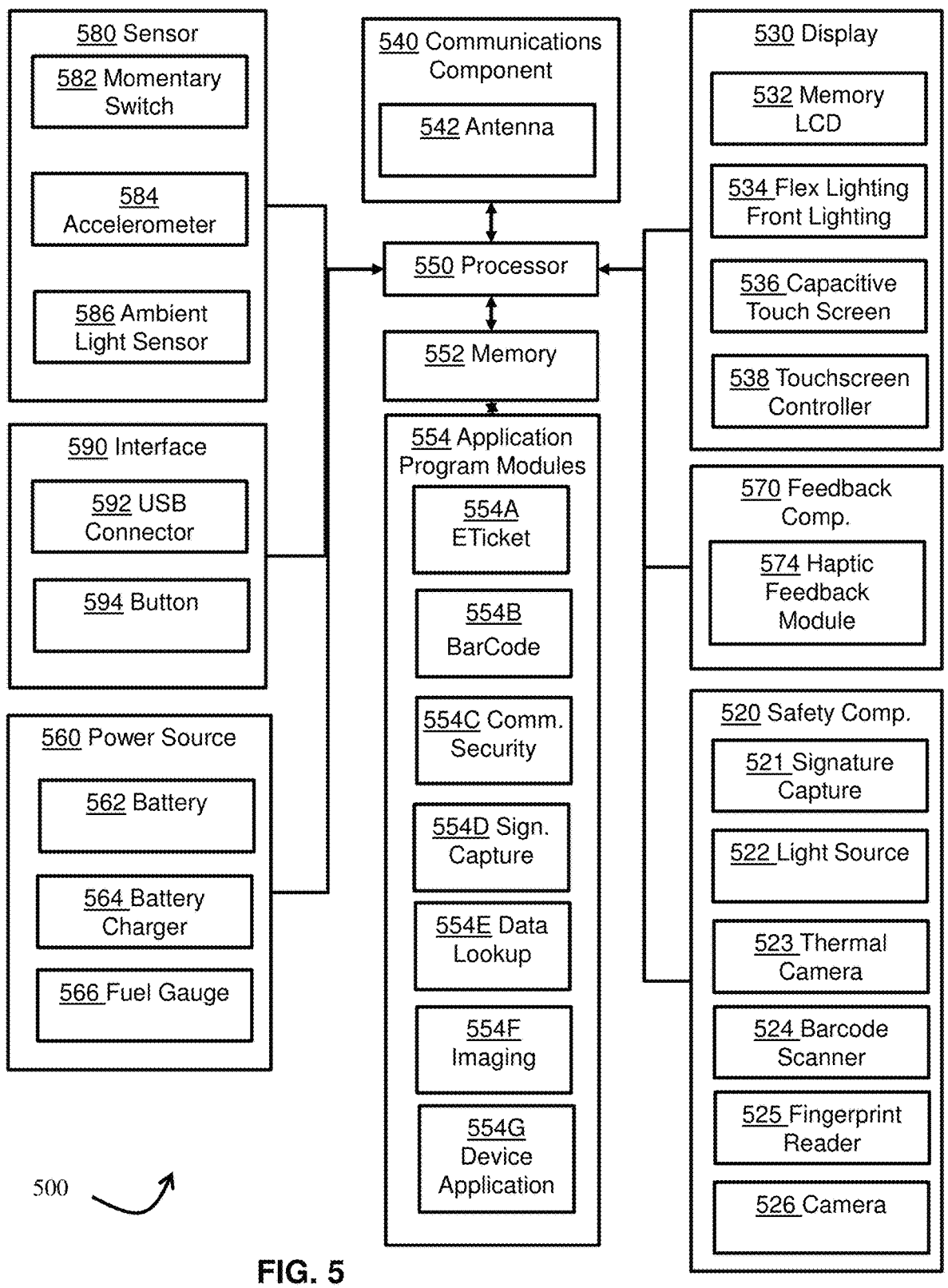
FIG. 5 is a block diagram illustrating components of an example embodiment of a wireless interface device.

Referring to the example embodiment illustrated by FIG. 5, the display 530 may comprise a memory LCD 532, flex lighting front lighting 534, a capacitive touch scree 536 and a touchscreen controller 538.

Figure 6A:
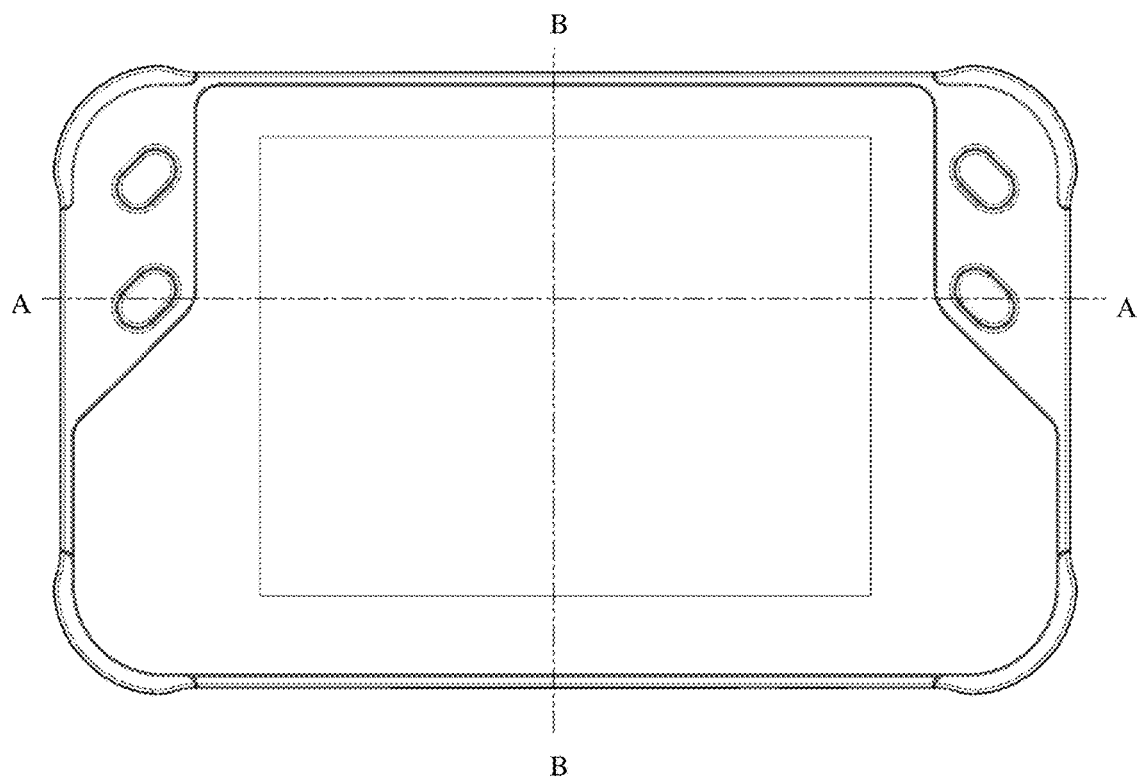
FIGS. 6A-6C show cross-sectional views of an example embodiment of a wireless interface device.
Figure 7:
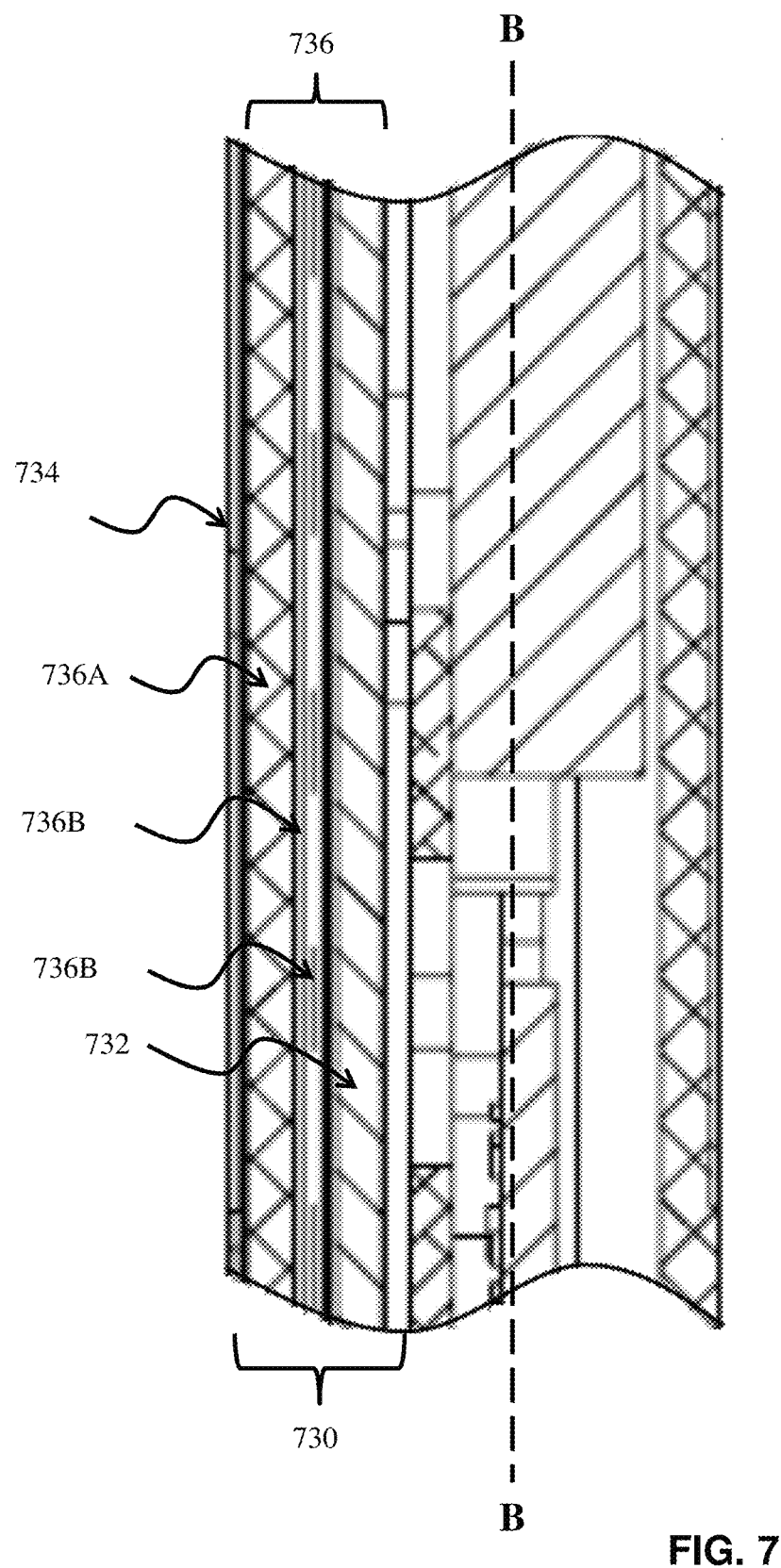
FIG. 7 shows a cross-sectional view of an example embodiment of a display for a wireless interface device.

In an example of a preferred embodiment, referring to FIG. 7's B-B cross-sectional view of the embodiment shown in FIG. 6A, the display 730 comprises an LCD 732, a touchscreen 736 and a touchscreen controller (not shown). In some embodiments, the display 730 further comprises a front lighting film 734 to further illuminate the LCD 732.

In some embodiments, the display 730 uses an ultra-low power memory LCD. This type of display allows the display 730 to display images for an extremely long time, such as for months, on a single 1200 mAh Lithium Ion battery. In a preferred embodiment, the LCD 732 selected is different than the LCD used commonly in cell phones that requires RAM to hold the screen buffer and continually refresh the display to hold the image on the screen. These typical LCDs require a lot of data to be passed quickly display an image, even if static. In contrast, memory LCDs for the display 730 of the wireless interface device 100 may only require 1 data line toggling at 20 hz to hold a static image making it consume only about 200 uW to hold the image. In some embodiments, the display 730 is comparable to e-ink displays found on e-readers such as the Kindle however even those devices cannot change quickly and the memory LCD can perform faster. Additionally, the interface for the memory LCD may be a SPI interface that only require 3 lines; a cell phone LCD requires a lot more lines and therefore consumes more power.

In a preferred embodiment, the LCD 732 comprises a 320×240 pixel, 4.4 inch Sharp Memory LCD ultra-low power display. Example specifications for a suitable memory LCD include the following as sold by Sharp Electronics Corp. of New York under the product category of Memory LCDs:

Data Memory in each Pixel: an embedded driver chip and peripheral circuit are located on the LCD glass.

Ultra-Low Power Consumption: the Memory LCD requires $1/40$ ~$1/80$ of an STN-LCD's power consumption and $1/1000$ of an AM-TFT LCD's power consumption; good reflective display performance without the need to add a backlight; the embedded pixel memory stores graphic data—so no continuous refresh is required for a still image; and less power consumption is required during refresh than for traditional graphic displays.

Rapid Image Refresh and Updating: faster response time than traditional graphic or bi-stable displays, enabling video and scrolling text; in contrast, typical cholesteric, STN, and e-paper displays require longer times to update the display image (several hundred milliseconds).

High Visual Performance: capability for graphic images—0.150 mm pixel pitch or narrower; high contrast for good indoor/outdoor readability. In contrast, typical cholesteric and reflective STN have below 10%; contrast and color are affected by temperature; viewable in wide range of light, from edge-of-vision darkness to bright sunlight; reflective or transflective configurations; high reflectivity allowing for good indoor/outdoor readability—HR Type: 20% (typ.); and wide/symmetrical viewing angle–Up to 170°×170°.

Simple Interface: simple 3-wire Serial I/F connectivity (SI, SCS, SCLK); and fewer peripheral components, as few as 3 capacitors may be required.

In an example embodiment, the touchscreen 736 for the display 130 is a capacitive touchscreen that operates on ultra-low power. In some embodiments, the touchscreen 736 is a high-resolution capacitive touchscreen having multiple power modes that reduce the power consumption when not tracking a finger. Such capacitive-type touchscreens typically include a cover glass and one or more thin film touch sensors 736B that communicate with a processor/controller to recognize the position of a finger due to the sensor 736B feeling changes in the electrostatic capacitance (electrical charge) generated when a finger touches a surface of the touchscreen.

Example specifications of a preferred embodiment of a suitable touchscreen 736 include: product structure: Glass+Film+Film; asahi 1.8 mm cover glass Chemical Strengthening; transmittance of ≥85%; surface hardness 6H; tempering strength CS≥450 mpa DOL 8~15 um; working temperature −10° C.~+70° C., ≤85% RH; storage environment −20° C.~+80° C., ≤95% RH; unlabeled size: ±0.2 mm; meets ROHS requirements; and linearity of 2MM.

In some embodiments, the touchscreen 736 communicates with a touchscreen controller. The touchscreen controller resolves the locations and reports the positions of fingers on the touchscreen. The touchscreen controller converts an array of sensor capacitances into an array of digital values, which are processed by touch-detection and position-resolution algorithms in the controller to determine the location and signal magnitude of each finger on the touchscreen. Such touchscreen controllers are sold by Parade Technologies, Inc. from San Jose Calif. under the brand name of TrueTouch Multi-touch All-points touchscreen controllers. Example specifications of a preferred embodiment of a suitable touchscreen controller includes: ARM 32-bit Central Processing Unit (CPU); and Multiple power states with the following typical power consumption profiles in those states (configuration dependent): 1.71- to 1.95-V or 2.0- to 5.5-V digital and I/O supply, 2.65- to 4.7-V analog supply, up to 9-mW average power, and up to 10.7-μW typical deep-sleep power.

In some embodiments, the display 730 further includes a front lighting film 734 to more efficiently illuminate the LCD display 730. This front lighting film 734 may comprise a custom film and lightguide allowing a single 20 mA LED to illuminate the LCD. In a preferred embodiment, the front lighting film 734 comprises an optical film to laminate the front surface of a display. Such front lighting film is sold by Flexlighting from FLExLighting II, LLC under the brand name of FLEx Front Light Panel. Example specifications of a preferred embodiment of a suitable front lighting film 734 include: 0.05 mm thickness, over 80× less power consumption as compared to traditional backlighting, and uses a single LED.

Optionally, the display may communicate with and receive commands from an ambient light sensor to control the front light and illuminate the LCD under dark conditions.

In some embodiments, the screen of the display 730 may also use a reflective technology allowing it to be visible in direct sunlight.

In some embodiments, the display 730 provides trackpad functionality.

Figure 6B:
Figure 6C:

An example of one embodiment of a display is shown in FIG. 6A and its cross-sectional views of FIGS. 6B, 6C and 7.

Power Source

Referring to the example embodiment of FIG. 5, the power source 560 generally provides power to the wireless interface device. In some embodiments, the power source 560 is a battery 562 such as a single lithium ion cell battery. In some embodiments, the wireless interface device has an additional fuel gauge 566 to provide accurate estimation on the life of the power source. In some embodiments, the power source 560 is coupled to a battery charger 564. In some embodiments, the charging speed of the power source 560 can be adapted based on the power input through the charging source such as a USB-C connector.

In an example embodiment, the power source 560 comprises a rechargeable lithium ion single cell battery such as those sold by Data Power Technology limited of XX Shenzhen, Guangdong, China under the model number DTP503759. Example specifications of a preferred embodiment of a suitable lithium ion single cell battery includes: rated capacity 1200 mAh; minimum capacity 1200 mAh; nominal voltage 3.70V; charge limited voltage 4.20V; discharge cut-off voltage 2.80V; end-of-charge current 0.01 C; standard charge: charge with 0.2 C (240 mA) up to limited voltage and charge with limited voltage up to end-of-charge current; standard discharge: using 0.2 C (240 mA) constant current discharge to the Discharge Cut-off Voltage; maximum continuous charge current 1 C (1200 mA); maximum continuous discharge current 1 C (1200 mA); maximum pulse discharge current 10 C (last no longer than 2 seconds); operating temperature range: Charge 0~45° C.; Discharge −20~60° C.; storage temperature range −20~60° C.; operating and storage humidity range 65±20% RH; and weight less than 26.0 g.

In some embodiments, the power source 560 is temperature hardened.

Internal Components

Referring again to the example embodiment in FIG. 5, the wireless interface device may comprise internal components to provide connectivity, instructions and power to other components of the wireless interface device. In addition to components such as a motherboard, these components may comprise a processor 550, a memory 552 and one or more application program module 554.

The processor 550 may be any processor suitable to process the instructions among the wireless interface device components. In one example embodiment, the processor 550 is a microprocessor that uses internal and external dc/dc converters and linear regulators to provide the most efficient method of power conversion to be used depending on the workload of the processor. In a preferred embodiment, the processor 550 comprises a microprocessor such as those sold by Nordic Semiconductor of Trondheim, Norway sold under the brand name of ARM® Cortex®-M4 processor. Example specification of a preferred embodiment of a microprocessor include: memory including 1 MB Flash+256 KB RAM; protocol support for Bluetooth 5, Bluetooth mesh, Thread, Zigbee, 802.15.4, ANT and 2.4 GHz proprietary stacks; on-chip cryptographic unit brings an extensive range of cryptographic options that execute highly efficiently independent of the CPU; high speed SPI and QSPI interfaces for interfacing to external flash and displays; a full speed USB device for data transfer and power supply for battery recharging; and on-chip adaptive power management system.

The memory 552 may comprise any type of processor accessible memory. In an example embodiment, the wireless interface device does not require a dynamic allocation of memory and this helps reduce the power demand from the device. In an example embodiment, the device uses the memory 552 resident on the processor 550.

The application program modules 554 include any software-based instruction modules that provide functionality to the wireless interface device. The application program modules 554 provide the functionality of the associated application. The application program modules 554 may comprise communication instructions. The application program modules 554 may comprise a device application module 554G to provide the functionality to configure and operate the wireless interface device and communicate with other application program modules. Such application program modules 554 may include: user configuration of all buttons, and screens to be used for keyboard, trackpad, device setup or flashlight control; a multitude of screens can be linked to allow custom keyboards or data entry for applications; and standard screens are provided for initial keyboard, trackpad, BLE (Bluetooth) setup, security and user settings.

The application program modules 554 may also communicate with, configure and function with other device components such as safety components 520. As described in more detail below, examples of application program modules functioning with safety components include: a barcode application module 554B functioning with a barcode scanner 524 or other image capture device to lookup data based on scanned documents of a suspect; a signature capture application module 554D to function with a signature capture component 521 to capture signatures from a suspect; an ETicket application module 554A functioning with the signature capture component 521 and the barcode scanner component 524 to populate and sign documents such as an ETicket; a data lookup application module 554E to lookup data that may be captured by safety components 520 such as the barcode scanner 524, the fingerprint reader 525 or the camera 526; and an imaging application module 544F to function with the camera 526 to store or display captured images.

The application program modules 554 may also comprise a communication security application module 554C to communicate with the communication component and encrypt or otherwise secure the communication channel between the wireless interface device and the device host.

Although FIG. 5 illustrates the application program modules 554 as part of a wireless interface device 500. It is understood that the application program modules may reside locally on the wireless interface device or they may reside on another device in communication with the wireless interface device and the application is executed on that other device. For example, as shown in FIG. 8, the application program modules may reside and be executed on the computer host, or they may reside on a remote computer, such as a server, in communication with the wireless interface device over an Internet connection or the application program modules may reside and be executed over some combination of these devices, hosts and remote computers.

Communication Component

Referring to the block-diagram of FIG. 5, the communication component 540 generally provides communications between the wireless interface device and the processor-based host. In some embodiments, the communication component 540 comprises a Bluetooth module. The Bluetooth module may function as a transmitter, receiver and/or transceiver. In some embodiments, a Bluetooth 5 module will be implemented and the user will be able to control most aspects of the connections. In some embodiments, a Bluetooth 5 module will include an antenna 542.

Ultra-low power Bluetooth modules allow for communication with the host and may allow for multiple power modes for operation. In a preferred embodiment, the communication component 540 comprises a Bluetooth 5 multi-protocol radio integrated with the ARM® Cortex®-M4 processor having specifications such as: 2 Mbps; CSA #2; +8 dBm TX power; −95 dBm sensitivity; 4.8 mA in TX (0 dBm); 4.6 mA in RX (1 Mbps); and integrated balun with 50Ω single-ended output The Bluetooth module may use the processor 550 and memory 552 to store and access its own application program module 554 to include a protocol stack. In one example embodiment, the Bluetooth module operates according to the Human Interface Device (HID) protocol. This HID protocol may operate with the device drivers in the host such as the device drivers in the Microsoft Windows operating system. The application program module 554 may also allow the user to modify the operational configuration of the Bluetooth module. Configurations may allow for less power consumption and security adjustments such as whitelist and blacklist creation to allow only specific Bluetooth connections between devices for additional security. Configurations to save on power consumption may include allowing the Bluetooth module to be configured to reduce the frequency of sending packet and to reduce the power of the RF amplifier. In some embodiments, the Bluetooth module is configured to further reduce power consumption by reducing the packet sending frequency the power to the RF amplifier.

In some embodiments, the communication link between the wireless interface device and the host may be a Wi-Fi link and may be a secured connection. For example, the communication link may be a secured wireless link, such as a Wi-Fi link, between the device and a tablet host.

Resulting Low Power Consumption

The wireless interface devices components have been configured to provide ultra-low power consumption when the wireless interface device is operating. The low power consumption of the device is due to the combination of the LCD, front lighting, touchscreen, communications module and the processing units selected.

Due to the memory LCD used, a simple microcontroller module is able to drive and refresh the LCD without any LCD controller or video RAM. This allows images to be retained for months off a single charge or over 150 hours of continual use.

The touchscreen contributes to low power consumption by having highly optimized firmware that uses 4 mW average power and 5.7 uW deep sleep power. The touchscreen controller is able to go into a "Look For Touch" mode that first detects presence of touch first then wakes up to start full scanning.

The Bluetooth module contributes to low power consumption by having integrated dc/dc and linear regulators that can be dynamically adjusted for best efficiency. All peripherals, clocks and memory can be individually controlled to optimize power. Bluetooth support the low energy BLE 5.0 standard and has best in class link budget and low power operation.

When used, the front lighting contributes to low power consumption using a single led with a custom designed waveguide and film to evenly disperse the light across the LCD.

Surprisingly, in combination, these components are able to provide an ultra-low power wireless interface device that is capable of operating for 150 hours of continual use on a single charge. This is significantly a significantly longer life of the battery with continual use than you can get with traditional cell phones or tv remote.

Safety Components

Safety components 520 may comprise any type of component that increases the safety features of the device. Most of these components provide ways for first responders to collect and analyze information quickly in a small form factor that can be operated with a single hand. These components are not combined as a design choice but are combined in specific ways to minimize unsafe situations first responders are exposed to.

In some embodiments, the safety components 520 comprise a light source 522. For example, multiple high-power LEDs may be used to create tactical strobes, alerts and flashlights in multiple colors. A brightness control may be provided for the light source 522. The high-power LEDs may be used as a flashlight, strobe, or alert. The flashing patterns, colors and brightness may be customized for specific functionalities by the application program modules accessible from the display. In a preferred embodiment, the light source comprises a high-power multi-color LED flash.

In some embodiments, the safety components 520 comprise a signature capture component 521. The signature capture component 521 may be any type of sensor capable of capturing a handwritten signature from the wireless interface device. For example only, and not for limitation, the signature capture component 521 may capture a digital signature as a biometric signature, graphometric or a digitized signature through the user interface of the device. In some embodiments, the signature capture component 521 captures the signature path and captures sufficient data to replay this digital signature. This type of digital signature may be necessary to meet legal requirements in certain jurisdictions. In some embodiments, for example for graphometric signatures, the signature path is captured and added to the electronic document. In some embodiments, an authentication method may be used that uses the dynamics of a person's handwritten signature. For example, the pen pressure and duration of the signing process, which is done with a stylus on a touchscreen or digital-based pen tablet, is recorded as an algorithm that is compared against future signatures. The signature capture component 521 may be configured to communicate with and provide data to an application program module such as a signature capture application module 554D to store and/or compare the digital signature to other signature information.

In some embodiments, the safety component 520 comprises imaging components such as a camera 526. The camera 526 may be configured to communicate with and provide data to an application program module such as an imaging application module 554F to allow the user to store or view images with the device user interface. In some embodiments, the imaging application module 554F may also be able to perform functions such as facial recognition.

In some embodiments, the safety components 520 comprises imaging components such as a thermal camera 523. The thermal camera 523 may be a Forward Looking Infra-Red (FLIR) thermal camera. The thermal camera 523 is configured to capture thermal data and create an image of an object by using infrared radiation emitted from the object. The thermal camera 523 may be configured to communicate with and provide data to an application program module such as an imaging application module 554F to allow the user to store or view thermal data with the device user interface. Integrating the thermal camera 523 with the device provides a portable thermal camera that can be used and manipulated outside of the vehicle. The portability and maneuverability provide a much more useful camera for the user when the user is outside of the vehicle.

In some embodiments, the safety component 520 comprises a barcode scanner component 524 to read barcodes or similar information. The barcode scanner component 524 may be an image capture device that communicates barcode images to a barcode application module 554B for determining the barcode or the barcode scanner component 524 may be a specific barcode scanner that similarly operates with the barcode application module 554B. The barcode scanner component 524 and the barcode application module 554B are helpful for first responders because information such as driver's licenses, vehicle registrations and other information sources may contain barcodes with pertinent information or provide codes to allow a lookup of pertinent information. This information may be used to search information databases for background checks or for population of information for ETickets from the barcode data. This automatic information gathering and lookup is helpful in minimizing the amount of time first responders are exposed and minimizes trips they may need to take back and forth from their vehicle. Minimizing trips and minimizing exposure increases the safety of the situation for the user.

In some embodiments, the safety component 520 comprises a digital fingerprint reader 525. Any type of reader capable of reading a fingerprint may be used such as an optical scanner or a capacitive scanner. In some embodiments, the digital fingerprint reader 525 comprises a fingerprint acquisition profile (FAP) 10 resolution reader specifically configured to scan sufficient data about a fingerprint to match national fingerprint databases such as the Federal Bureau of Investigation's Fingerprint Identification Record System (FIRS). Use of these specifically configured fingerprint readers allow the first responder to more quickly and more accurately identify persons they are investigating. This identification may identify dangerous personnel and may simply be used to overcome language barriers for the first responder. Identifying these persons quicker reduces the time the first responder may be exposed in a dangerous situation and may minimize the trips they have to make back and forth from their vehicle. The fingerprint reader 525 may be a scanning device that communicates fingerprint data to a data lookup application module 554E for looking up data such as identification information in a fingerprint database based on the fingerprint data.

Additional Embodiments

In some embodiments, the wireless interface device will be constructed to be a ruggedized device. For example, the wireless interface device may be constructed with a rugged machined aluminum case with all corners protected for impact from accidental dropping. In ruggedized embodiments, the case may be sealed for IP67 water resistance even with the USB-C connector uncovered which means the unit can be dropped into a body of water up to a meter deep for half an hour. In these embodiments, the capacitive touchscreen may be designed with chemically strengthened glass at 1.5 mm thickness to increase the durability of the display screen.

In some embodiments, referring to FIG. 5, the wireless interface device 500 may further comprise additional peripheral components such as sensors 580, feedback components 570 or interfaces 590.

Sensors 580 may comprise any type of sensors that can collect and communicate sensor data to the wireless interface device. In some embodiments, the sensors 580 may comprise: a momentary switch 582, accelerometers (e.g., 3-axis accelerometers) 584, cameras and an ambient light sensor 586.

Feedback components 570 may comprise any type of component that provides feedback to the user beyond any feedback provided by the display. In some embodiments, the feedback components 570 may comprise a haptic feedback module 574 to add to the touch feel of touchscreen and also act as an alert method to be signaled from the host to the wireless interface device.

In some embodiments, interfaces 590 may be provided such as a USB connector 592 or buttons 594. Buttons 594 may comprise externally accessible buttons to be actuated by the user. The commands from the buttons 594 may be customized by the user at any time and are also dependent on the various screen being displayed. These buttons 594 may be configured to provide features such as operating other components such as flash strobes, mouse clicks or other customized events to be signaled to the processor and operating system.

In some embodiments, an externally accessible USB port/connector 592 may be provided. A USB-C port may be provided to allow rapid charging of the battery, firmware updates, and customized functionality to be download to the device. The USB port can also allow the use of the keyboard\trackpad as a wired device for those not wishing to use the wireless functionality. Additional features for upload of data such as signatures and fingerprints can also be provided. In a preferred embodiment, USB support to the operating system will use standard HID driver support making customized drivers unnecessary.

In some embodiments, a wireless interface device is provided that may require more processing power but may include additional sensors or components such as: a thermal camera, an IR camera, a color camera and a Wi-Fi communication component.

Figure 2B:
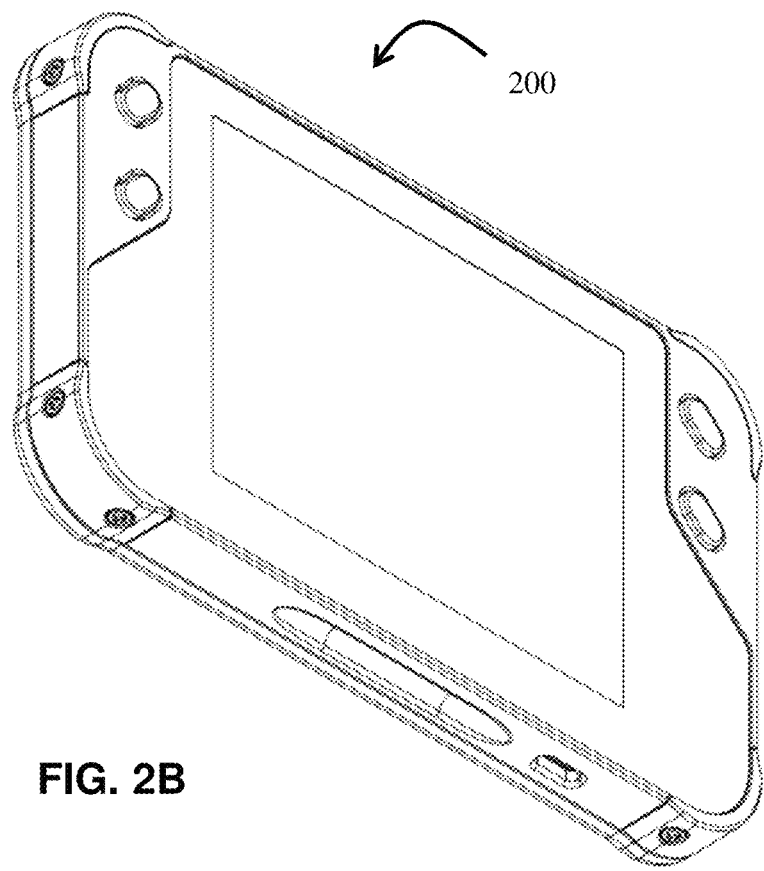

The ornamental design of one example embodiment of a wireless interface system is shown in the following drawings where: FIG. 1 shows a front view, FIGS. 2A and 2B show perspective views, FIG. 3 shows a rear view, FIG. 4 shows a side view and FIGS. 6D-6E show a top, bottom, right side and left side views respectively.

Example Embodiments for First Responders

One example embodiment of the wireless interface systems is designed for first responder personnel working in specific roles such as, but not limited to law enforcement, emergency medical service and military personnel. The selection and combination of specific components for the wireless interface device is not a design choice but a choice of component combinations to provide specific characteristics particularly beneficial to those users. Those types of users have unique requirements in their roles that are addressed by specific device configurations and features.

In some embodiments, the form-factor provided by the casing provides several features specifically for these users. A small form-factor allows the wireless interface device to be carried with the other equipment that the user is carrying. The casing may be shaped with rounded edges to prevent the device snagging clothing or other equipment in the tight quarters of a vehicle and may be hardened or otherwise configured to withstand repeated outdoor, in-vehicle and on-person use.

In some embodiments, the choice of the display provides several features specifically for these users. As a potential user of power for the device, an ultra-low power memory liquid crystal display (LCD) allows the device to have a GUI with a lower power demand. The resulting low power demand allows the device to be used for extended periods of time when a first responder is away from a convenient power source. Although personnel such as law enforcement personnel may be operating in or near a vehicle, the inventors understand that it is highly likely that some users will not always use the vehicle as a source to charge the device for various reasons. Reflective displays and those with ambient light sensors to control display lighting accommodate the different environments the personnel may be in.

In some embodiments, the inclusion of a touchscreen with the display provides a simple and familiar interface to the user with less probability of a mechanical malfunction. The simplicity of the interface is helpful for users that may be wearing gloves or may have limited room for movement such as when they are in a vehicle with other equipment around them. Allowing the user to operate the device with one hand also keeps the user's other hand available for safety or other purposes.

In some embodiments, the use of a rechargeable lithium ion single cell battery as a power source allows the wireless interface device to have a high energy density in the small form-factor which allows the device to be extremely portable. Lithium ion batteries also have a lower self-discharge rate than other battery types which allow the device to operate longer between charges. The rechargeable features allow users to recharge during their off-shift times or during their shift if needed.

In some embodiments, the use of internal components that minimize the power demands of the power source help minimize the times the device has to be charged which aligns better with the working patterns of first responders.

In some embodiments, specific components are combined to provide features unique to first responders. For example, the wireless interface device may be a configurable portable personal protection device for use by a first responder with specific components such as a light source or a sound source. The light source, such as a high-power LED, provides a light source for first responders when needed or provides a strobe that may be used as a beacon or as a tool to help subdue suspects. The sound source may be used as an alarm or as a tool to help subdue suspects.

In some embodiments, safety components may be incorporated into the wireless interface device to provide features helpful to first responders. For example, the wireless interface device may comprise components such as a signature capture component, a camera, a thermal camera, a barcode scanner component or a digital fingerprint reader. These safety components may be in communication with application program modules to configure, manage and operate the safety components.

In some embodiments, the configurable portable personal protection device does not need to incorporate the wireless interface features and may rely on wired connectivity to the computer host.

Operationally, example embodiments allow a first responder, such as a law enforcement officer, to have a (single hand) hand-held portable device in wireless communication with the computer host in the vehicle. While the officer is in the vehicle, the device may be a user interface with the computer host. The user interface can provide input using simple touchscreen interactions similar to those interactions with a cellphone. The small form factor eliminates larger keyboards from the vehicle interior. When the officer leaves the vehicle, such as at a traffic stop, the officer can take the wireless interface device outside of the vehicle and bring it to the stopped vehicle. The wireless interface device can be operated as a single, hand-held device which frees up the officer's other hand for safety or defense purposes. At the stopped vehicle, the wireless interface device can take information from text input or sensors (e.g., Barcode scanners, fingerprint readers) and interact with application program modules to perform tasks such as to lookup or confirm identities or to populate tickets or citations. These application program modules and applicable databases may reside on the device itself or may be distributed over the computer host or other remote computers/servers. Having these features consolidated on a hand-held device in communication with the vehicle based computer host eliminates the need for multiple trips to the vehicle where each trip raises safety issues, the risk of the stopped vehicle leaving and the risk of the situation changing when the officer returns to the stopped vehicle.

Operationally, consolidation of features such as a camera, sensors, lights and thermal camera's provide additional tools to provide more information to the first responder. Currently, many of these tools are fixed with the vehicle or are provide by more bulky devices.

Operationally, providing specific components such as a FAP10 compliant fingerprint reader allows a data lookup application module to use that digital fingerprint data to compare against database sources such as FBI fingerprint databases. Similarly, an ETicket application module can communicate an ETicket or ETicket fields to the officer and the signature capture component can capture a digital signature in a format accepted by legal authorities. These functions can be performed without the need for the law enforcement office to make another trip back and forth from their vehicle.

The separation of this device from other devices such as a cell phone, also prevents chain of custody issues and reduces the need for "requalifying" the vehicle.

The resulting convenience and low power consumption from these combinations of components provides a helpful tool for first responders.

ONE EXAMPLE EMBODIMENT OF THE WIRELESS INTERFACE SYSTEM IN OPERATION

Operation of one example embodiment of the wireless interface system is described using an example embodiment of a hand-help wireless interface device that communicates with a Bluetooth 5 module. The wireless interface device may be originally be provide provided with pre-configured features or the user may be able to customize the configuration by allowing the user, through a graphic user interface (GUI) on the display, to load application modules, run application modules, run scripts, adjusting volume, adjust brightness, customize the (GUI) and customize buttons on the device for the functionality of keyboards, trackpads and sliders.

Generally, the steps of operation start with the user powering on the device. Once powered, the display pulls the last GUI layout from the memory LCD and presents that to the user. The user may use that GUI layout to provide input to the device or the user may select another interface layout through pulldown or button menus visible on the display. The user provides an input by touching the GUI and that input is communicated from the display controller to the microprocessor and then to the communication module and antenna. Communication is them made according to the microprocessor communications instructions through the antenna to the antenna on the remote host. For HID standard implementations, the communication is made through HID descriptor exchange.

The host Bluetooth module then communicates the user input to the device drivers for the operating system of the host. In one example embodiment, the user input provides functions similar to those of a keyboard and a mouse to the remote host.

In some embodiments, the steps of operation may further include configuring the buttons to actuate components such as alarms and strobe lights.

In some embodiments, the steps of operation may further include receiving feedback from the remote host. Such feedback may comprise alarms such as having an LED flash or having a haptic alarm provided by a haptic actuator.

One example embodiment of components of the wireless interface system may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

Computer program, software program, program, application, module, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A portable personal protection device for use by a user having a vehicle-based host, the portable personal protection device comprising:
    a device casing conforming to a hand-held form factor;
    a user interface comprising a touchscreen configured to receive input from the user;
    a wireless communication component configured to communicate with the vehicle-based host;
    a signature capture component configured to capture a digital signature from the user interface;

the digital signature comprising a physical signature of a third party;
a processor in communication with the wireless communication component, the user interface and a device application module;
the device application module comprises an ETicket application module configured to receive the digital signature and populate an ETicket with ETicket data comprising the digital signature;
the ETicket comprises a law enforcement citation;
the digital signature comprises a graphometric signature;
the graphometric signature comprises a signature pressure data, a time data and a signature path data of the graphometric signature over a signature path whereby the graphometric signature associates the physical signature of the third party and the third party with the graphometric signature;
whereby the graphometric signature complies with a requirement for a valid signature of the third party for the ETicket; and
the device application module configured to communicate the ETicket data to the vehicle-based host.

2. The portable personal protection device of claim 1 wherein:
the graphometric signature comprises a plurality of data sets over the signature path; and
the plurality of data sets including the signature pressure data, the time data and the signature path data of the graphometric signature whereby the signature pressure data and the signature path data are dynamic over the time data and whereby the graphometric signature complies with the requirement for a valid signature for the ETicket.

3. The portable personal protection device of claim 1 further comprising:
a thermal camera configured to capture a thermal data;
the processor further in communication with the thermal camera; and
the device application module further configured to communicate the thermal data to the user interface.

4. The portable personal protection device of claim 3 wherein the thermal camera comprises a forward looking infrared (FLIR) thermal camera.

5. The portable personal protection device of claim 1 further comprising:
a fingerprint reader configured to capture a digital fingerprint of the third party;
the processor in communication with the fingerprint reader; and
the device application module configured to receive the digital fingerprint and communicate the digital fingerprint to the vehicle-based host.

6. The portable personal protection device of claim 5 wherein the fingerprint reader comprises a fingerprint acquisition profile (FAP) 10 compliant scanner whereby the digital fingerprint of the third party may be compared to a database of one or more digital fingerprints to identify the third party.

7. The portable personal protection device of claim 1 further comprising:
an image capture device; and
a barcode application module whereby a barcode data may be captured by the image capture device; and
the barcode application module is in communication with the device application module and the ETicket application module whereby the ETicket may be populated with the barcode data.

8. The portable personal protection device of claim 7 wherein the barcode data comprises barcode data selected from the group consisting of:
a driver's license barcode data; and
an insurance policy barcode data.

9. The portable personal protection device of claim 1 wherein the wireless communication component is configured to encrypt communications over a wireless link with the vehicle-based host.

10. The portable personal protection device of claim 7 wherein:
the portable personal protection device further comprises:
a thermal camera configured to capture a thermal data,
the processor further in communication with the thermal camera,
the device application module further configured to communicate the thermal data to the user interface, and
the thermal camera comprises a forward looking infrared camera;
the portable personal protection device further comprises:
a fingerprint reader configured to capture a digital fingerprint,
the processor in communication with the fingerprint reader,
the device application module configured to receive the digital fingerprint and communicate the digital fingerprint to the vehicle-based host, and
the fingerprint reader comprises a fingerprint acquisition profile (FAP) 10 compliant reader whereby the digital fingerprint may be compared to a database of one or more digital fingerprints;
the portable personal protection device further comprises:
the touchscreen configured to receive an input and translate the input to an input signal,
the wireless communication component configured to receive the input signal and communicate the input signal according to a predefined application programming interface standard, and
the predefined application programming interface standard defining a conversion of the input signal to one or more remote host client drivers selected from the group of client drivers consisting of a keyboard driver and a mouse driver; and
the wireless communication component comprises a Wi-Fi microcontroller configured to communicate over an encrypted wireless link with the vehicle-based host.

11. The portable personal protection device of claim 1 wherein:
the device casing has a front side and a back side;
the portable personal protection device further comprises a power source;
the processor further in communication with a light source and a button switch;
the button switch positioned on the front side of the device casing;
the button switch is a physical actuator;
the light source positioned on the back side of the device casing;
the light source activated by the button switch;
the device application module configured to configure one of a plurality of lighting effects for the light source when activated by the button switch; and
the light source comprises a high power Light-Emitting Diode (LED) whereby the high power LED is configured to be used as a protective tool to visually disorient a potential aggressor.

12. The portable personal protection device of claim 11 wherein:
   the high power LED comprises a multi-color LED; and
   the plurality of lighting effects comprises at least:
      a strobe light.

13. The portable personal protection device of claim 11 further comprising:
   a display in communication with the processor;
   a wireless communication component in communication with the processor;
   the display configured to receive an input, translate the input to an input signal and communicate the input signal to the processor; and
   the wireless communication component configured to receive the input signal from the processor and communicate the input signal over at least one communications channel to a processor-based host.

14. The configurable portable personal protection device of claim 13 further comprising:
   the power source comprising a battery power source;
   the battery power source requiring a charge to provide power for the portable personal protection device to operate; and
   the portable personal protection device configured to operate in a continual use mode for a period of 150 hours without requiring an additional charge to be provided to the battery power source.

15. The portable personal protection device of claim 1 further comprising:
   a light source positioned on a back side of the device casing; and
   the light source comprises a high power Light-Emitting Diode (LED) whereby the high power LED is configured to be used as a protective tool to visually disorient a potential aggressor.

16. A portable personal protection device for use by a user having a vehicle-based host, the portable personal protection device comprising:
   a device casing conforming to a hand-held form factor;
   a user interface comprising a touchscreen configured to receive input from the user;
   a wireless communication component configured to communicate with the vehicle-based host;
   a signature capture component configured to capture a digital signature of a third party from the user interface;
   a fingerprint reader configured to capture a digital fingerprint;
   the digital signature comprising a physical signature of a third party;
   an image capture device configured to capture a barcode data;
   a device application module;
   a processor in communication with the wireless communication component, the user interface, the fingerprint reader, the image capture device and the device application module;
   the device application module comprises an ETicket application module configured to receive an ETicket Data and populate an ETicket with the ETicket data;
   the ETicket comprises a law enforcement citation;
   the ETicket data comprising:
      the digital signature comprising a graphometric signature including a plurality of data sets over a signature path whereby the plurality of data sets includes a signature pressure data, a time data and a signature path data, whereby the signature pressure data and the signature path data are dynamic over the time data, and whereby the graphometric signature uniquely associates the physical signature of the third party and the third party with the graphometric signature, and
      the barcode data wherein the barcode data comprises a driver's license barcode data;
   the digital fingerprint comprises a fingerprint acquisition profile (FAP) 10 compliant digital fingerprint whereby the digital fingerprint may be communicated to the vehicle-based host and compared to a database of one or more digital fingerprints to identify the third party;
   the barcode data further comprises an insurance policy barcode data whereby the insurance policy barcode data may be communicated to the vehicle-based host; and
   the ETicket application module further configured to communicate the ETicket data to the vehicle-based host and populate the ETicket with the ETicket data.

* * * * *